United States Patent [19]
Hoffmann et al.

[11] 4,106,027
[45] Aug. 8, 1978

[54] INK FOR THE INK JET PROCESS

[75] Inventors: Klaus Hoffmann; Rudolf Meyer, both of Leverkusen; Hans Ohlschlager, Schildgen, all of Fed. Rep. of Germany

[73] Assignee: AGFA-Gevaert AG, Leverkusen, Fed. Rep. of Germany

[21] Appl. No.: 725,352

[22] Filed: Sep. 22, 1976

[30] Foreign Application Priority Data

Sep. 26, 1975 [DE] Fed. Rep. of Germany ....... 2543092

[51] Int. Cl.$^2$ ...................... G01D 15/18; B41J 27/00; C09D 11/00
[52] U.S. Cl. ......................................... 346/1; 106/22; 346/140 R
[58] Field of Search ............... 346/1, 75, 140; 106/22, 106/23, 20

[56] References Cited

U.S. PATENT DOCUMENTS 3,705,043 12/1972 Zabiak .................................. 106/20
3,994,736 11/1976 Hertz ........................... 346/140 R X

OTHER PUBLICATIONS

Edds et al.; *Smear Resistance Jet Ink;* IBM Tech. Disc. Bulletin, vol. 16, No. 6, Nov. 1973, p. 1950.
Kotla, J.J.; *Ink Jet Infrared Ink,* IBM Tech. Disc. Bulletin, vol. 19, No. 1, Jun. 1976, p. 105.

*Primary Examiner*—Joseph W. Hartary
*Attorney, Agent, or Firm*—Connolly and Hutz

[57] ABSTRACT

Non-aqueous inks having an electric conductivity of at least $10^{-4} Ohm^{-1} cm^{-1}$, a viscosity of at most 5 cP at 20° C and in which the liquid medium consists completely or predominantly of one or more solvents having each an evaporation index of less than 11 are most useful for the ink-jet recording process in which a jet of ink is ejected from a nozzle by application of pressure and after its breaking up into droplets is modulated according to the information to be recorded. Such inks are particularly useful for writing on non-absorbent surfaces.

7 Claims, No Drawings

INK FOR THE INK JET PROCESS

This invention relates to a process for the recording of information in the form of lines, marks, alphanumerical signs or images by the ink jet process and in particular to novel writing liquids (inks) which are particularly suitable for this purpose.

Numerous processes for the contact-free recording of information on almost any surfaces have become known in recent years. Particularly interesting among these are the various forms of the ink jet process (see, for example, R. Meyer, K. Hoffmann; 4. Intern. Kongress Reprogaphie and Information, Plenarvortrage pages 184 to 199, 1975). In some of the various forms of the ink jet process, a jet of writing liquid is ejected from a fine nozzle under the action of a high hydrostatic pressure, and the jet is modulated according to the information to be recorded and is directed to a writing surface which generally has a relative component of movement transverse to the direction of the jet. Modulation of the jet in accordance with the information can be achieved, for example, by means of a control electrode which electrically charges the jet from the nozzle according to the information to be recorded so that the ink jet is fanned out to varying degrees. This results in a variation in the proportion of ink which is not deflected and therefore passes through a narrow aperture to reach the writing surface, as described in German Pat. No. 1,271,754. In another process, a uniform electric charge is imparted to the jet of liquid which has broken up into droplets after its emission from the nozzle, and the charged droplets are then deflected from their original line of flight by deflecting electrodes according to the information to be recorded. The part of the original jet which has not been deflected reaches the writing surface, where it registers the information in the form of lines, marks, alphanumerical signs or images, as described in U.S. Pat. No. 3,596,275.

In the variations of the ink jet process mentioned here the ink must be suitable for sufficiently rapid removal of the electric countercharge of the electric charges imparted to the droplets into which the ink jet has broken up. It has been found that this requires an electrical conductivity of at least $10^{-4}$ Ohm$^{-1}$cm$^{-1}$. Highly insulating writing liquids such as the solutions of dyes in oils or petroleum hydrocarbons described in Japanese Patent Application No. 49-50935, for example, have a much lower electric conductivity and are therefore unsuitable for the variations of the ink jet process described here. Also the inks described in German Offenlegungsschrift No. 2,516,268 having a liquid medium consisting essentially of a mixture of formamide and an aliphatic monohydric alcohol have not the high electric conductivity of at least $10^{-4}$ Ohm$^{-1}$Cm$^{-1}$ required for the ink jet process described here. The fine nozzles used for producing the jet generally have a diameter of less than 60 μm. The ink should therefore have a very low viscosity so as to ensure a sufficiently high rate of flow through the fine nozzles at the given writing speeds and writing temperature, which is generally room temperature, thereby ensuring a sufficiently high colour density of the recording. The viscosity of the writing liquid should suitably be below 5 cP at 20° C.

If the writing surfaces are made of water absorbent materials such as paper, absorbent textile fabrics, leather or foils coated with a hydrophilic substance, the inks used for these variations of the ink jet process may be aqueous solutions of dyes as described for example in German Offenlegungsschrift Nos. 2,258,804; 2,258,836, and 2,258,837. These aqueous inks easily fulfil the above mentioned requirements of low viscosity and sufficiently high electric conductivity. It is well known that if the nozzles are kept out of operation for prolonged periods during which they are not kept supplied with fresh ink, aqueous inks tend to dry up inside the nozzle or in the porous absorbent material forming part of the writing head or on the control electrodes, thereby considerably impairing the operational reliability of the apparatus. This problem has been attributed to the relative high volatility of the solvent (water) used in aqueous inks. It has therefore been proposed to treat aqueous inks with certain additives designed to prevent unwanted drying up of the ink as described in German Offenlegungsschrift Nos. 2,258,835 and 2,260,464. This measure succeeded in further improving the operational reliability of the process, and ink treated with such additives still dries sufficiently rapidly and without smudging on the absorbent writing surfaces mentioned above.

It has been found, however, that these aqueous inks are not suitable when attempts are made to use the ink jet process for writing on water-repellent surfaces or surfaces which absorb water only slowly. Surfaces of this kind are found, for example, on materials such as hydrophobic polymers metals, glass or porcelain. Aqueous writing liquids are particularly unsatisfactory if the marks made on the writing surface are required to dry within a very short time, for example 1 to 2 seconds. Such rapid drying is often necessary for example for writing on rapidly moving bands which are passed over guide rollers or rolled up at a short distance from the writing apparatus so that the written side of the bands is brought into contact with other surfaces, or if articles on which the ink marks have been made (individual sheets, packets, envelopes) are required to be stacked shortly after the writing operation without any of the written information being indesiredly printed on the surface with which it comes into contact.

It has been found that for these purposes, i.e. when using the ink jet process for recording on hydrophobic surfaces or surfaces which are difficult to wet, it is particularly suitable to use inks consisting of solutions of organic dyes in a medium of predominantly readily volatile solvents.

The present invention relates to a process for the recording of information by the ink jet process in which a jet of writing liquid having a viscosity of less than 5 cP at room temperature and an electrical conductivity greater than $10^{-4}$ Ohm$^{-1}$cm$^{-1}$ is ejected from a nozzle solely by means of pressure and is directed to a writing surface having a relative component of movement transverse to the direction of jet, and in which the jet of writing liquid breaking up into droplets is electrically charged and is modulated according to the information to be recorded, characterised in that the writing liquid used is a solution of a dye in a liquid medium consisting either completely or predominantly of one or more organic solvents having an evaporation index of less than 11.

The finding that readily volatile solvents are suitable for the ink jet process is surprising since it has hitherto been assumed that the risk of blockage of the fine nozzles, which generally have a diameter of less than 60 μm, is all the greater the more easily the ink dries up, i.e. the more volatile its solvent. For this reason, the water based inks previously used have even been treated with special substances as already mentioned above, to prevent drying up of the inks by preventing evaporation of the water in them. It has now surprisingly been found that the inks according to the invention, which are dissolved in highly volatile solvents not only achieve the desired rapid drying of information written with them on hydrophobic or relatively non-wetting surfaces but also do not cause blockage of the nozzles during prolonged periods of inactivity provided that care is taken to ensure that during the periods of inactivity, when the pressure is switched off, a certain amount of ink is always left in the nozzle chamber which is situated behind the nozzle and bounded by the ink inlet. If the apparatus is to be left out of action for several days or weeks, the ink feed system may be flushed with pure solvent after completion of the final spray process in order to prevent drying up of the ink.

Whereas only water-soluble dryes are suitable for the known water-based inks used in the ink jet process, the use of predominantly non-aqueous solvents according to the invention opens up the possibility of using numerous new classes of dyes since it is now possible also to use dyes which are insoluble or only sparingly soluble in water. The dyes may belong to any known class of dyes provided they are soluble in the solvents used.

Suitable dyes include, for example, anthraquinone dyes such as Alizarine cyanine green 5 G, C.I. 62 560; Alizarine rubinol 3 G C.I. 68 205; azo dyes such as Zapon Fast red, C.I. 12 715; ceres black BN, C.I. 26 150; ceres yellow GRN, C.I. 21 230; Irisol fast scarlet GN, C.I. 27 291; xanthene dyes such as Rhodamine B. C.I. 45 170; eosin, C.I. 45 380; pyronine G. C.I. 45 005; phenacine dyes such as Safranin T, C.I. 50, 240; Mauvein C.I. 50 245; oxazine dyes such as Nile blue, C.I. 51 180; nigrosin dyes such as Brilliant spirit black RM; thiazine dyes such as Methylene blue, C.I. 52 015; acridines such as Acridine orange C.I. 46 055; indigoid dyes such as Indorubin C.I. 73, 200; thioindigo, C.I. 73 300; triphenyl methane dyes such as Spirit blue C.I. 42 775; Patent blue C.I. 42 045; malachite green C.I. 42 000; phthalocyanines such as Zapon Fast blue HFL C.I. 74 350; polymethine dyes such as Astra Violet 3 R, C.I. 48 010; Astrazon yellow 3 G. C.I. 48 055; Astraphloxine, C.I. 48 070 etc.

Special effects and colour shades can be obtained by mixing several dyes. UV absorbents or white toners or dyes having their main absorption in the infrared region of the spectrum may also be used for certain purposes. The concentration of dyes in the inks used according to the invention is not critical and depends only on the solubility and intensity of colour of the dye used and the intended purpose of use. It is normally sufficient to use 0.5 to 12% by weight of dye based on the total weight of the ink, although higher concentrations may be used for special purposes.

For some purposes, in particular when the ink jet process is used in the photographic industry, for example for marking and labelling light-sensitive materials such as webs of film or paper, it has been found necessary to use inks containing dyes capable of absorbing light which does not cause any blackening i.e. imagewise recording, on the photographic materials employed. The marks made with the ink can then be inspected with non-actinic light at any time without the photographic material being thereby exposed. Numerous dyes have been found which are readily soluble in the organic solvents used according to the invention and at the same time absorb at least 30% of the incident radiation in the near infra-red region of the spectrum (700 to 1000 nm) to give rise to a sufficiently high colour density. Examples of such dyes include the known basic nigrosin dyes or dyes of the polymethine series such as penta- or heptamethine cyanines.

According to the invention, the marks formed on the recording surfaces should be dry in a short time. The solvents must therefore evaporate very rapidly. Low boiling organic solvents with an evaporation index of less than 11 meet this requirement. For definition of evaporation index reference may be had to Losemittel Hoechst, 5th Edition 1974, page 313; German Standards DIN 53 170, I 1954). Mixtures of two or more miscible solvents having each an evaporation index if less than 11 may be used instead of pure solvents. Suitable solvents include, for example, alkanes and cycloalkanes, preferably having 5 to 8 carbon atoms such as pentane, hexane, cyclohexane or isooctane; lower alcohols such as methanol ethanol or isopropanol; ethers such as diethyl ether, dioxane or tetrahydrofuran; aromatic hydrocarbons such as benzene or toluene; halogenated hydrocarbons such as methylene chloride, chloroform, carbon tetrachloride, ethylene chloride, trichloroethylene or 1,1,2-trichloro-1,2,2-trifluoroethane; ketones such as acetone, methyl ethyl ketone or methyl isobutyl ketone; or esters such as ethyl formate, methyl acetate, propyl acetate, butyl acetate or ethyl propionate.

The liquid medium in which the dyes are dissolved consist completely or mainly, i.e. up to at least 85% by weight, of such organic solvents having evaporation indices of less than 11. It may contain up to 15% by weight of solvents having an evaporation index above 11. The proportion of such less easily volatile solvents depends mainly on their evaporation index as well as on their miscibility with the main solvent components which have evaporation indices below 11. For example, if the added solvent has a very high evaporation index, it may added only at a minor proportion, e.g. up to 2 or 5% by weight. Thus in, the specific case of added formamide or glycol the amount of these added solvents must not exceed 0.5% by weight of the total liquid medium. If the solvents of the liquid medium are miscible with water, up to 15% by weight of water may be added to increase the electrical conductivity although the required electrical conductivity is generally obtained even without water when the dye is dissolved in readily volatile solvents.

Another suitable method of obtaining the necessary electrical conductivity consists of adding conductivity salts to the dye solution. The salts used for this purpose are preferably readily soluble and highly dissociated salts of organic acids and bases, for example ammonium acetate.

If very low viscosity solvents such as acetone or methyl ethyl ketone are used, it may be advantageous to add small quantities, e.g. up to 2%, of a thickener or film forming substance such as Celite to the writing liquid in order to improve the image formed by the ink jet on the smooth surface of the writing material.

In view of the small diameter of the nozzles used in the ink jet process, it is advisable to filter the inks before use to preventing blockage of the nozzles by coarse particles of dust in the ink. The filter pores must, of course, be smaller by an order of magnitude than the diameter of the nozzle (e.g. filter pores of 5 $\mu$m for nozzle diameter of 40 $\mu$m). To ensure prolonged trouble-free operation of the filters, it is advisable to use only inks consisting of true chemical solutions not containing any solid particles such as toners or pigments.

Examples of suitable inks according to the present invention are given below.

EXAMPLE 1

2.5 g of phenol black L (Commercial product of Bayer AG Leverkusen)
100 ml of acetone and
0.8 g of Cellit (acetone soluble acetyl cellulose) are mixed at room temperature in a vessel with stirrer. 10 ml of water are added.

The solution is first course filtered through a fluted filter (Schleicher and Schull No. 1406 ½) and then fine filtered through an acetone resistant membrane filter having a pore size of 1 μm (Millipore DURALON).

EXAMPLE 2

25 g of Astra violet 3 R (C.I. 48 010),
1000 ml of acetone and
6 g of Cellit are mixed as in Example 1, and
100 ml of water are added. Filtration as in Example 1.

EXAMPLE 3

62.5 g of Brilliant spirit black RM (C.I. 50 415; (Commercial product of Bayer AG) are mixed with 1000 ml of ethanol, heated in a water bath at 75° C for 30 minutes and stirred. After cooling to room temperature, the solution is rough filtered as in Example 1 and then fine filtered through an alcohol resistant pore filter (RC 60, Schleicher and Schull).

EXAMPLE 4

255 g of Brilliant spirit black RM are added to 1500 ml of methylene chloride with stirring over a period of 15 minutes. The solution is then stirred for a further 15 minutes, filtered through a fluted filter (Schleicher and Schull No. 589²) and then through a pore filter with a pore size of 1 μm (RC 69 Schleicher and Schull), using a glass fibre filter as preliminary filter (GF/B Whatman). The solution is diluted to 6000 ml with ethanol denaturated with a small amount of toluene.

EXAMPLE 5

40 g of heptamethine cyanine

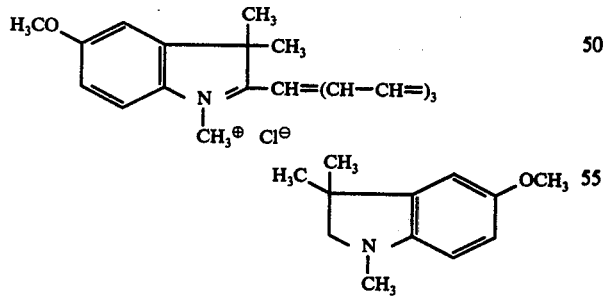

are dissolved in 1000 ml of methanol. An ink ready for spraying is obtained after filtration through a filter having a pore size of 1 μm.

The inks described in Examples 1 to 5 are very suitable for use in the ink jet process described in German Auslegeschrift No. 1,266,002 for applying a line code to polyethylene coated paper which can subsequently be read with the aid of a photoelectric reading head. The inks are dry 1 to 3 seconds after application.

The inks described in Examples 1,3,4 and 5 also produce marks on polyethylene surfaces which can be read with the aid of an infra-red reading head, i.e. under illumination with light from an infra-red luminous diode (Example Litronix Lit 40).

We claim:

1. A process for the recording of information on a support by the ink jet method in which a jet of writing liquid having a viscosity of less than 5 cP and an electric conductivity greater than $10^{-4}$ Ohm$^{-1}$cm$^{-1}$ is ejected from a nozzle by the application of pressure and is directed to a receiving surface having a relative component of movement transverse to the direction of jet and in which the jet of writing liquid breaking up into droplets is electrically charged and is modulated according to the information to be recorded, wherein the improvement comprises depositing on a hydrophobic, non-absorbent receiving surface a writing liquid consisting essentially of a dye in a liquid medium consisting of from 85 to 100% of an organic solvent having an evaporation index of less than 11, from 0 to 15% by weight of solvent having an evaporation index greater than 11, whereby the writing liquid rapidly dries on the hydrophobic surface without causing blockage in the nozzle.

2. In the process as claimed in claim 1 the step of forming the liquid in a jet for ejection from a nozzle of less than 60 μm in diameter.

3. Process as claimed in claim 1, in which 85 to 100% by weight of the liquid medium of the writing liquid consists of a mixture of methylene chloride and ethanol, and the balance consists of one or more solvents having each an evaporating index greater than 11.

4. Process as claimed in claim 1, in which the writing liquid contains a dye which absorbs infra-red light(700 to 1000 nm).

5. Process as claimed in claim 4, in which the writing liquid contains Phenol black L or Brilliant spirit black RM (Commercial products of Bayer AG, Leverkusen).

6. Process as claimed in claim 4, in which the writing liquid contains a dye of the formula

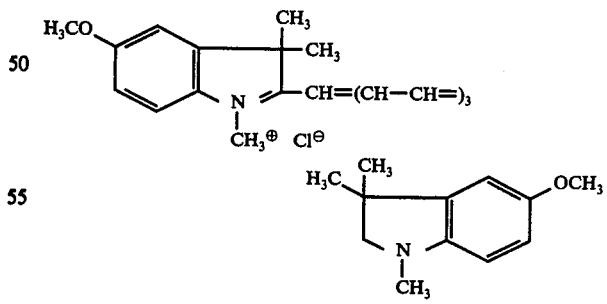

7. In the process as claimed in claim 1, the liquid medium including as a solvent glycol or formamide in an amount not exceeding 0.5% by weight.

* * * * *